(12) United States Patent
Suzuki et al.

(10) Patent No.: US 7,427,166 B2
(45) Date of Patent: Sep. 23, 2008

(54) NEUTRAL GENDER MT-TYPE FERRULE, ADAPTER, AND POLISHING METHOD

(75) Inventors: Toshio Suzuki, Saitama (JP); Gregory Bunin, Deerfield, IL (US)

(73) Assignees: Adamant Kogyo Co., Ltd., Tokyo (JP); Illum Technologies, Inc., Northbrook, IL (US)

( * ) Notice: Subject to any disclaimer, the term of this patent is extended or adjusted under 35 U.S.C. 154(b) by 46 days.

(21) Appl. No.: 10/951,105

(22) Filed: Sep. 27, 2004

(65) Prior Publication Data

US 2006/0067628 A1    Mar. 30, 2006

(51) Int. Cl.
    G02B 6/38    (2006.01)
(52) U.S. Cl. .......................................... 385/85
(58) Field of Classification Search .................. 451/415, 451/460, 282; 385/53–55, 59, 60, 72, 78, 385/85
    See application file for complete search history.

(56) References Cited

U.S. PATENT DOCUMENTS

| | | | | |
|---|---|---|---|---|
| 5,838,856 A | * | 11/1998 | Lee | 385/54 |
| 5,862,281 A | * | 1/1999 | Shahid | 385/78 |
| 6,238,278 B1 | * | 5/2001 | Haftmann | 451/279 |
| 6,823,109 B2 | * | 11/2004 | Sasaki et al. | 385/34 |
| 6,934,450 B2 | * | 8/2005 | Hiramatsu | 385/52 |
| 6,986,608 B2 | * | 1/2006 | Choudhury et al. | 385/59 |

FOREIGN PATENT DOCUMENTS

WO    WO 9200538 A1  *  1/1992

* cited by examiner

*Primary Examiner*—Sarah Song
(74) *Attorney, Agent, or Firm*—Patzik, Frank & Samotny Ltd.

(57) ABSTRACT

A new, neutral gender MT-type connector ferrule and adapter are being disclosed. The ferrule consists of a body with a number of optical fiber channels and two, not removable, guide pins. The ferrule does not have a male/female configuration. In our invention, the guiding pins are fixed to the ferrule body and located in the recessed portion of the body in such a way that they do not protrude beyond the face (contact surface) of the fibers. This design has several advantages over the standard MT-type ferrule. The new ferrule is easier to terminate, easier and less expensive to produce and improves the optical performance of the connection by increasing the positioning accuracy of the mating fibers. Connector systems based on this new ferrule design need a novel mating adapter. The design of this adapter is shown in this invention. The new adapter has V-grooves to hold, under pressure, the guiding pins of the ferrules. This zero-gap design contributes to the higher performance of the system. The ferrule alignment pins are used as a datum to perform proper polishing procedure.

1 Claim, 6 Drawing Sheets

POLISHING PROCESS

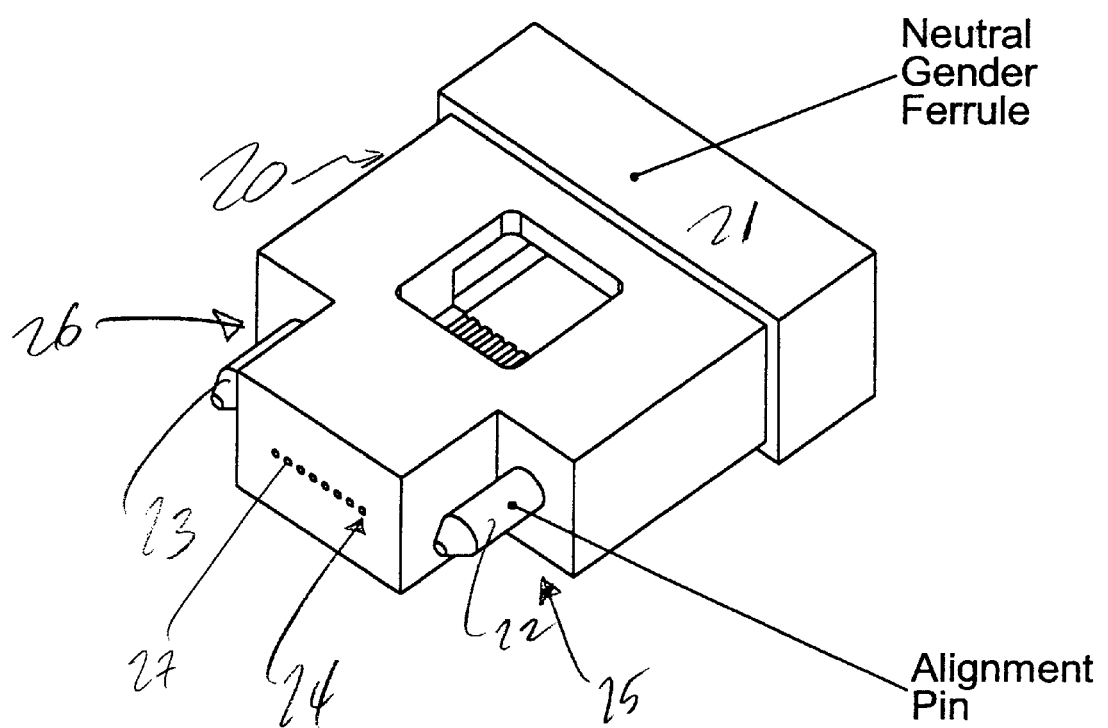
FIG. 2 NEUTRAL GENDER FERRULE

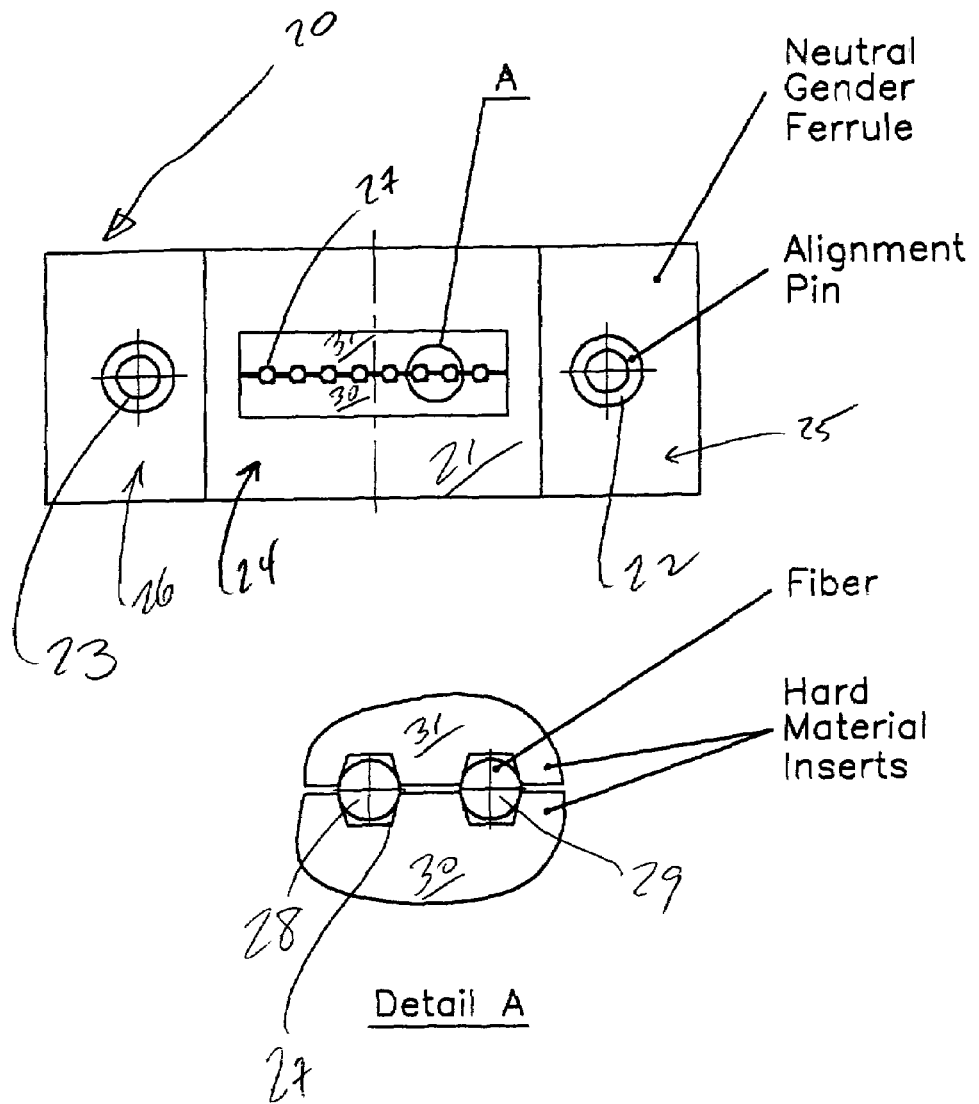
FIG. 2a NEUTRAL GENDER FERRULE
(Version With Inserts)

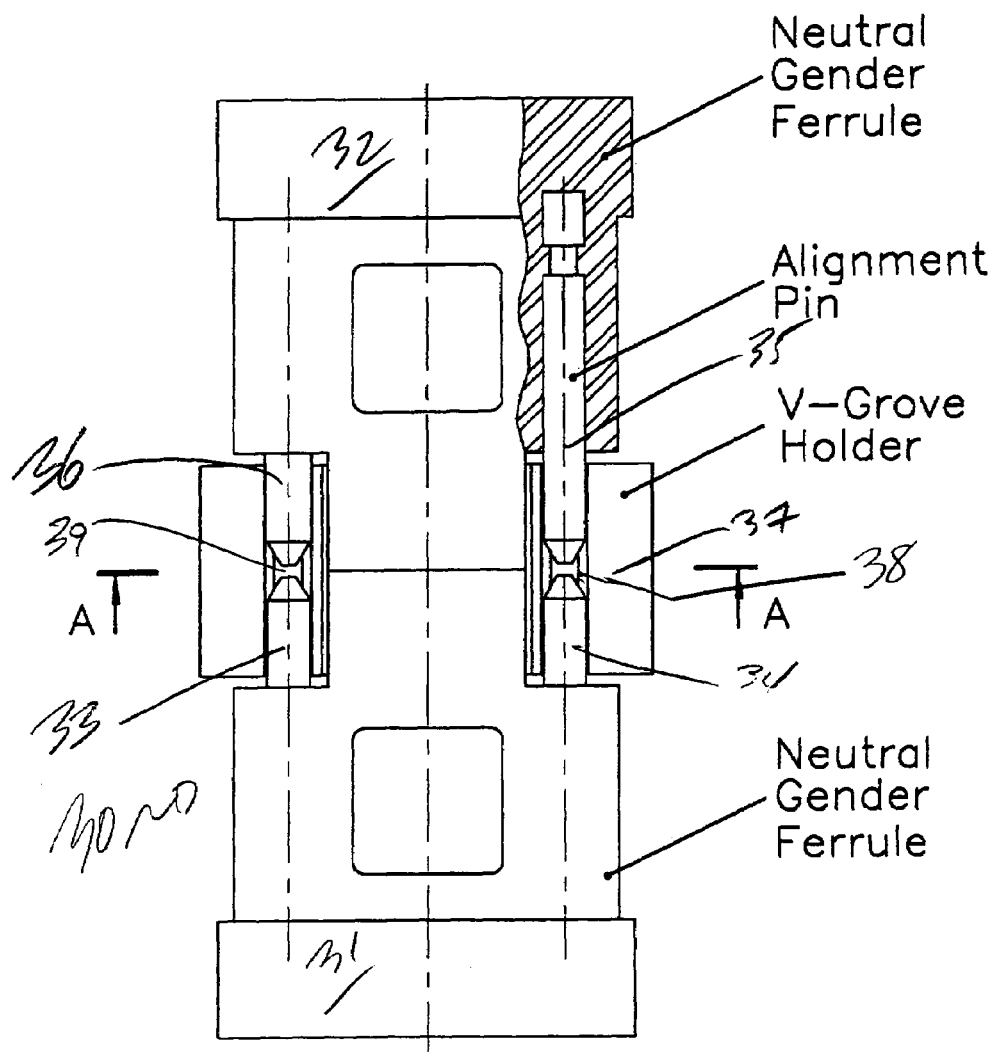
FIG. 3 MATED FERRULES

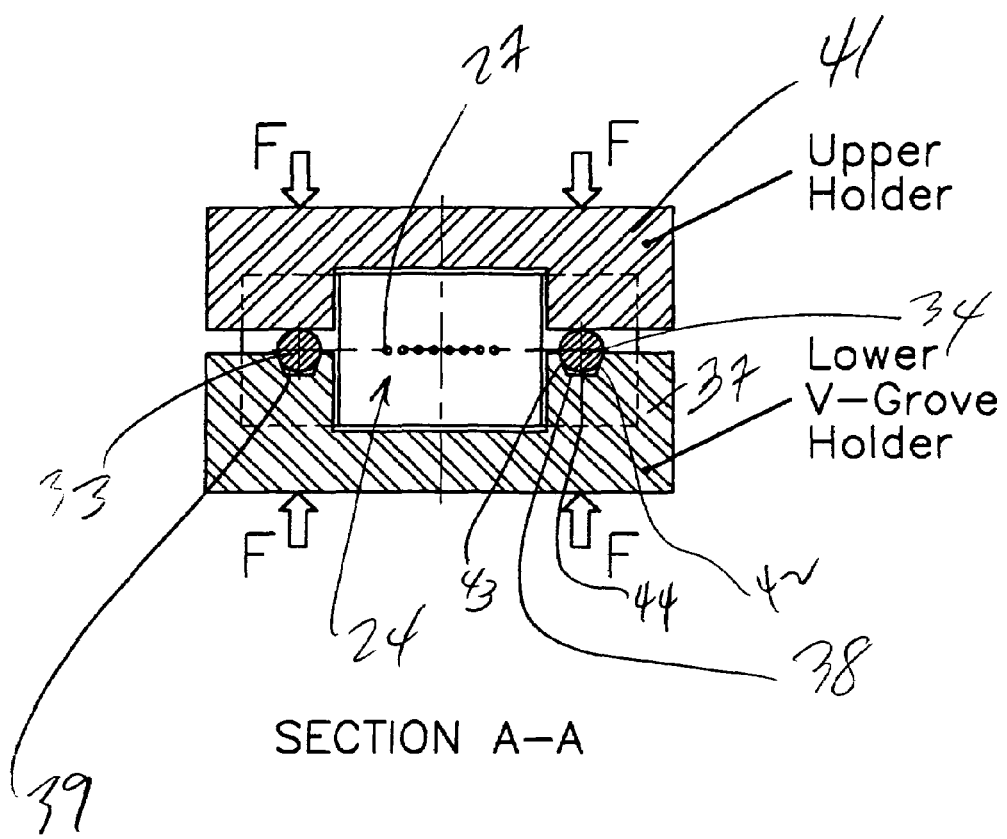
FIG. 4 SECTION OF FIG. 3

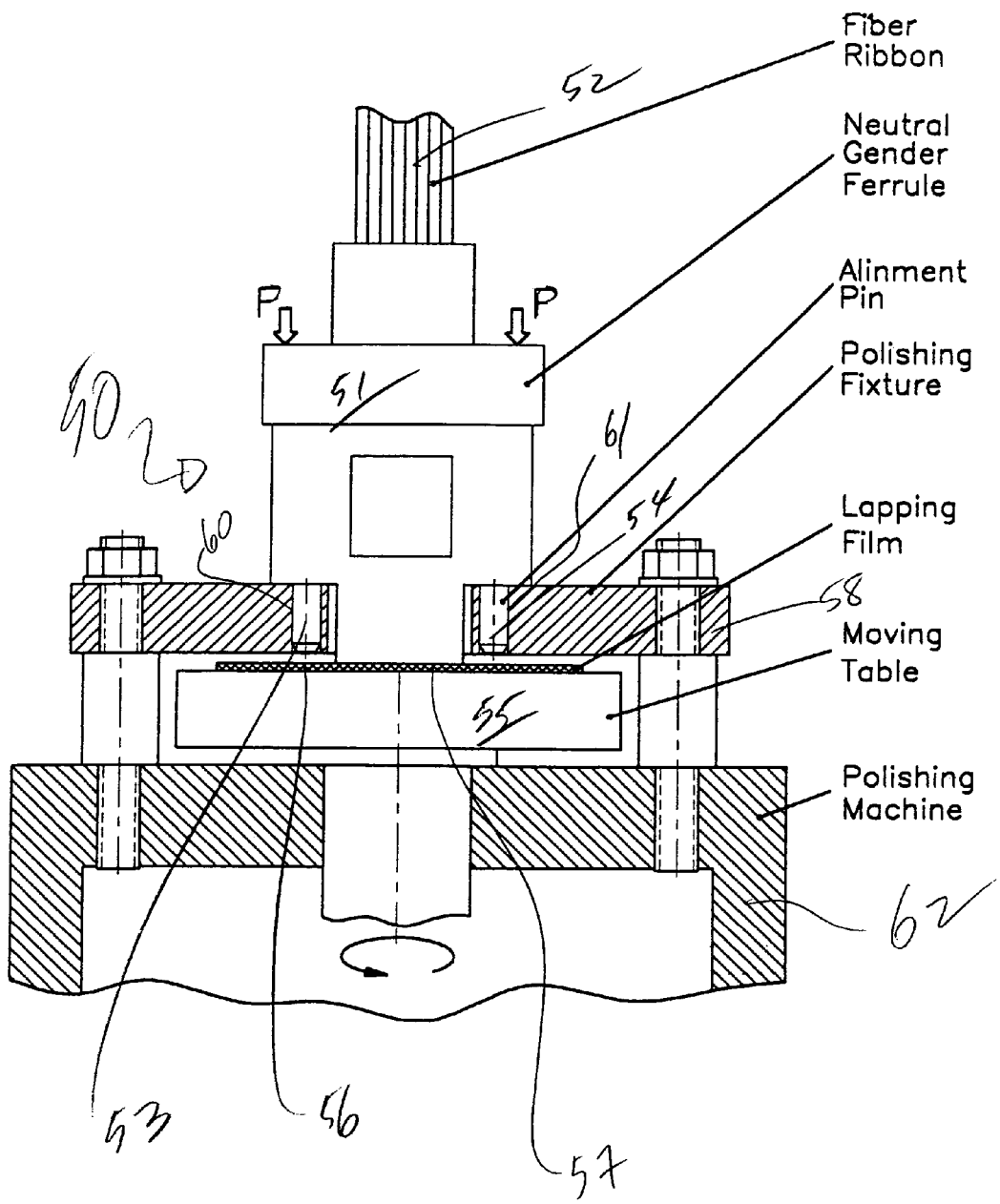
FIG. 5 POLISHING PROCESS

NEUTRAL GENDER MT-TYPE FERRULE, ADAPTER, AND POLISHING METHOD

FIELD OF THE INVENTION

This invention relates to the field of multiple fiber optical connectors, and more particularly to a neutral gender MT-type ferrule and adapter design as well as a corresponding polishing method.

BACKGROUND OF THE INVENTION

In the fiber optics field the need frequently arises to transfer light from one fiber to another. One solution to this problem is the use of optical connectors. Optical connectors can have single or multiple fiber configurations. Single fiber connectors provide the connection of only one fiber to another single fiber. In multiple fiber connectors several fibers are simultaneously coupled with another set of similar fibers. The invention here disclosed applies to multiple fiber applications.

Because of their higher density, multiple fiber connectors are becoming very popular in fiber optic applications. The connection is performed by fixing the fibers inside channels contained in the ferrule. Two ferrules are coupled inside an adapter that has the function of aligning the fibers and keeping the connection together. When mated together a pair of connectors must have their respective contained optical fibers properly aligned in end to end fashion for efficient light transfer with the fiber in the other connector of the mated pair. One such type of connector is the MT (or "Mechanical Transfer") type connector which is made in various numbers for up to 72 fibers (or "in a linear arrays").

A connector having 72 channels would be arranged in 6 arrays of 12 fibers each. Any number of channels above 12 would be in multiples of 12, such as 12, 24, 36, 48, 60 and 72.

Prior art MT connectors includes a substantially rectilinear body having a front mating surface and a parallel rear surface. The protective buffer is removed from the ends of the fibers and the fibers enter the connector through the rear surface as part of a fiber ribbon cable. The holes by which the individual fibers are exposed at the front mating surface are formed with very precise tolerances. The fibers are set in place within the holes by epoxy or other suitable adhesives. The ends of the exposed fibers as well as the front mating surfaces are polished. Connector springs are often used to hold the mated pair of connectors together to ensure that the ends of the mating fibers remain in contact, under a standard mating force.

The required alignment is typically achieved in MT-type connectors by mounting two pins in the holes of one of the ferrules and each pin is held in place by a pin holder. After this assembly operation the ferrule becomes a male ferrule. By placing spacers (not shown) behind the corresponding holes on another ferrule, the second ferrule becomes a female ferrule. When male and female ferrules mate, the pins from the male ferrule penetrate into the holes of the female ferrules, and thus the desired alignment is achieved. This design is shown in Prior Art, FIG. 1. To introduce the pins, the holes typically should have a slightly larger diameter than the pins, thereby reducing the accuracy of the alignment and consequently the optical performance of the connection. Another disadvantage of the prior MT-type connector design is that the body of the ferrule has to be used as a datum during the polishing process necessary to terminate the optical fibers. This requires a higher degree of precision during manufacture of the ferrule body, typically molded from a plastic material. The new design of the present invention eliminates this requirement. Additionally, in the conventional MT-type connector the whole surface of the ferrule should be polished, including the area around the holes. The holes then need to be cleaned after polishing.

The object of the invention is to provide a simpler and more accurate MT-type ferrule. This is achieved by a gender neutral configuration. The guiding pins are placed in a recessed area of the body of the ferrule and are either over molded or immovably fixed in some other way to the ferrule body.

The guiding pins are over molded in the same mold as the fiber channels, which makes the positioning of these pins very accurate relative to the fiber channels. The length of the pins is such that they do not protrude beyond the contact surface and consequently the ferrules can be terminated with the pins attached. The pins can then be used as a datum for placement of the ferrules in the polishing machine, eliminating the need for tight tolerances with respect to the body of the ferrule. Additional accuracy can be achieved if the prior art method of transferring accuracy is used. In that method a fixture is used to align the fibers relative to each other in a fiber passageway and an adhesive is then applied to maintain the position of the fibers.

The fact that both ends of the connectors carrying the cables are identical facilitates their use by the installers. Only one type of gender neutral MT-type of connector need be kept in inventory. The smaller number of parts (there are no pin holders) also has inventory reduction advantages.

The alignment is achieved in this invention by a zero gap configuration between the alignment pins and the V-grooved adapter body. The pins are kept under pressure by a spring or spring clip to obtain zero gap positioning. In addition, the gap can be decreased by use of placing the pin in a precision sleeve or hole or better yet in a V-groove to eliminate the gap. As a result, the gap between conventional guide pins and guide holes of traditional MT-type connectors is eliminated, so as to provide for a more accurate connector.

Withdrawal and insertion forces are more consistent in the present invention than in conventional MT-type connectors since they are determined by the springs inside of the adapter and not by the always different gap between guide pins and guide holes. Because of the unavoidable tolerances in the guide pins and guide holes of every such pair, the elimination of the guide pins and guide holes of traditional MT-type connectors is a significant advantage. The area of the ferrule face surface that is polished together with the fibers is smaller in the design of the present invention. There is no plastic material to polish around the guide holes, since there are no such holes. The polishing process is thus faster, more consistent, more accurate, and can be more simply automated if necessary.

The cleaning operation after polishing is simpler and faster. In particular, there are also no pins to avoid when cleaning male ferrules and no hard to clean deep guide holes in female ferrules.

The mold for the new ferrules is cheaper since the outer body of the ferrule no longer needs tight tolerances because it will not be used as a datum during polishing. Accordingly, the outer body of the ferrule of the present invention does not need the same level of precision as a conventional MT-type connector.

SUMMARY OF THE INVENTION

The above-listed objects are met or exceeded by the present Neutral Gender MT-Type Ferrule, Adapter, and Polishing Method. The fiber optic connector-adapter system comprises a first ferrule with a body having a first surface into which at least one optical fiber is received and a second substantially parallel mating surface at which an end of at least one optical fiber is exposed for light transfer with a mating second ferrule. The system further comprises the first ferrule body further comprising two fixedly attached alignment pins operably positioned proximate the mating surface so as to be substantially gender neutral and enabling mating connection with a second ferrule.

The first ferrule further comprises the alignment pins being positioned in recessed areas of the body so as not to protrude beyond the mating surface. An adapter comprises a pin holder for engagement with two of the alignment pins of the ferrule in a zero gap alignment between the alignment pins and the pin holder. The pin holder is configured so as enable engagement of two alignment pins of two different ferrules in zero gap alignment between said alignment pins and said pin holder to join said ferrules in mated connection.

The pin holder comprises at least one V-groove for secure receipt of each of the alignment pins. The adapter further includes at least one biasing member to bias and retain at least one of the alignment pins within the adapter and maintain a specific insertion and withdrawal force of the ferrule with respect to the adapter. The alignment pins serve as a datum for proper polishing of the ferrule.

A method for polishing of a fiber optic connector includes a ferrule having a mating surface and alignment pins on a polishing machine. The polishing machine has an abrasive surface and holes in a ferrule holding fixture and comprises: mounting the ferrule on the polishing machine; pushing the alignment pins into the holes of the fixture so as to use the pins as the datum for proper alignment; clamping the ferrule to the fixture; and, pushing the ferrule against the abrasive surface with a controlled force.

Another embodiment of the fiber optic connector-adapter system comprises a first ferrule with a body having a first surface, into which at least one micro lens is received, and a second substantially parallel mating surface at which an end of at least one micro lens is exposed for light transfer with a mating second ferrule. The system comprises the first ferrule body further comprising two fixedly attached alignment pins operably positioned proximate the mating surface so as to be substantially gender neutral and enabling mating connection with a second ferrule.

Hence, significant advantages are provided by the present invention over other fiber optic connector-adapter systems and in particular such MT-type ferrules, adapters and polishing methods.

BRIEF DESCRIPTION OF THE DRAWINGS

The accompanying drawings show in detail prior art and the preferred embodiment of the invention.

FIG. 2 is a perspective view of the neutral gender ferrule of the present invention.

FIG. 2a is an end view of the neutral gender ferrule of a version of the present invention, including a detailed view of the fibers within hard material inserts (i.e. metal, silicon or ceramic).

FIG. 3 is an overhead, partial cut-away view showing two neutral gender ferrules in a mated condition.

FIG. 4 is a cross-sectional view taken along line A-A of FIG. 3 and in the direction of the arrows of the mated pair of connectors of FIG. 3.

FIG. 5 is a partial cut-away side view of one of the possible fixtures for polishing of the neutral gender ferrules.

DETAILED DESCRIPTION OF THE PREFERRED EMBODIMENT

Figure 1:
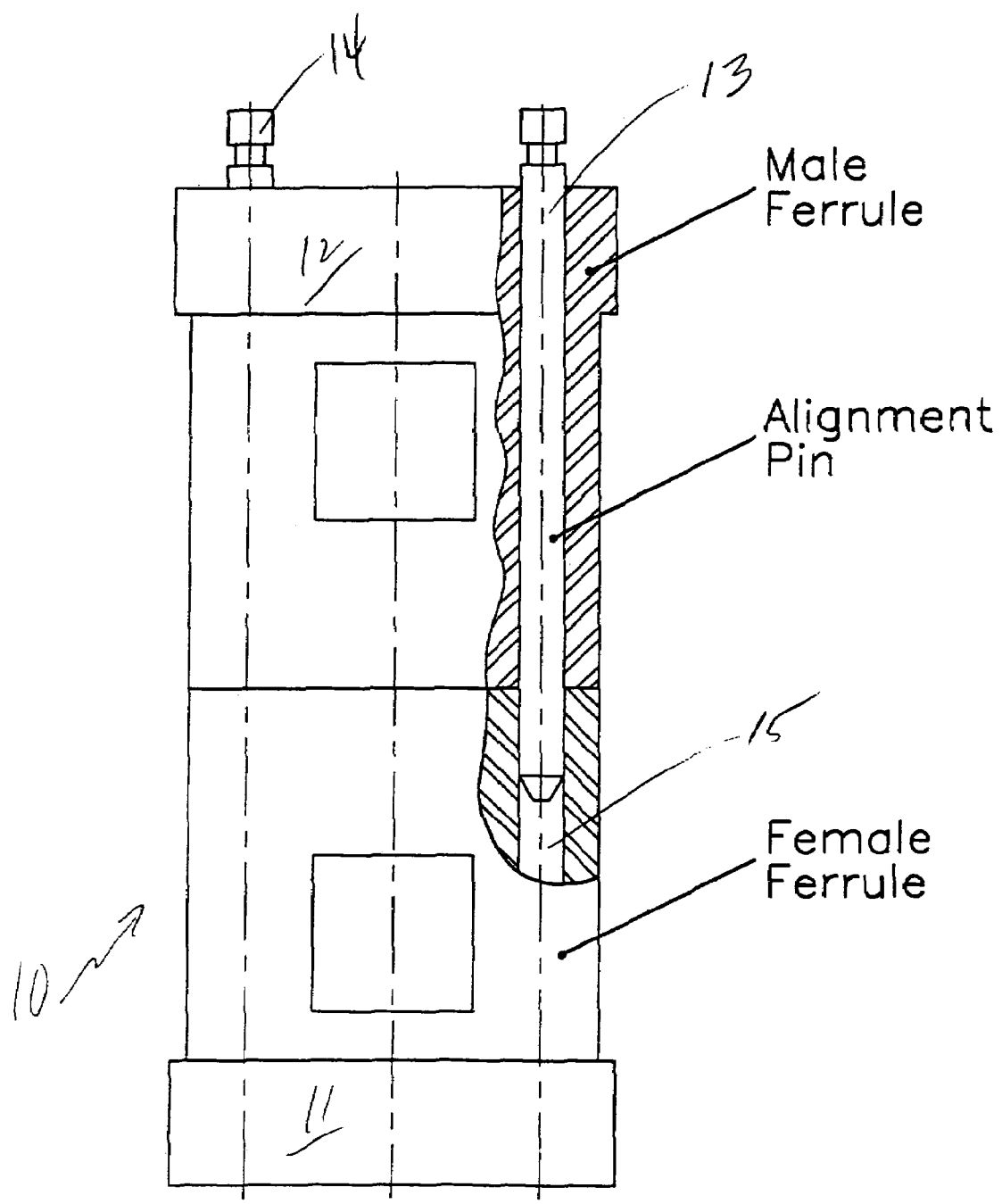
FIG. 1 shows an overhead, partial cut-away view of a mated pair of prior art MT-type ferrules.

FIG. 1 shows the prior art, where two standard MT ferrules 10 (one male 12 and one female 11) are in the mated position. Guiding pins from the male ferrule 13, 14 penetrate into the holes 15 of the female ferrule 11. The action of the alignment pins 13, 14 is to position the two ferrules 11, 12 in such a way that fibers (not shown) from one of them are aligned to the corresponding fibers in the other ferrule, so as to permit light propagation. This alignment and thereby the efficiency of the connection is limited by the tolerances in both pins 13, 14, holes 15, and their respective positioning relative to the ferrule 11, 12.

FIG. 2 shows a perspective view of the neutral gender ferrule 21, which is the subject of the current invention. In FIG. 2 it is shown that the area where the pins 22, 23 are located 25, 26 is recessed relative to the mating surface 24. The alignment pins 22, 23 are fixed to the body of the ferrule 21 and do not protrude beyond the mating surface 24. For clarity purposes, only one line of fiber holes 27 is shown in the mating surface 24, in this and the following figures. The ferrule 21 could have several rows of fibers 27. This embodiment applies equally to the traditional structure of ferrules with polished fibers, or to ferrules with micro lenses.

FIG. 2a shows the mating surface 24 end of neutral gender ferrule 21. Also shown are alignment pins 22 and 23 and recessed areas 25, 26. Section A of FIG. 2a shows a close up view of an alternative embodiment of the invention also including hard material inserts 30, 31 above and below fibers 28 and 29 contained within holes or V-grooves 27 (only V-grooves are shown).

FIG. 3 shows two neutral gender ferrules in a mated position 30. The guiding or alignment pins 33, 34 of ferrule 31 and pins 35, 36 of ferrule 32 are aligned by V-grooves 38, 39 contained in a lower V-groove holder 37.

A cross sectional view taken along line A-A of FIG. 3 is shown in FIG. 4. The pins 33, 34 are shown here positioned between upper holder 41 and lower V-groove holder 37 in the V-grooves 38, 39 of lower holder 37 and pushed into the V-grooves 38, 39 with a specific force F. The upper holder can have either a flat surface or another V-groove (not shown) that matches V-grooves 38, 39 in the lower holder. Force F can be provided by a leaf spring, rubber sleeve or wave spring (not shown) of any type. In this version of the invention, V-grooves 38, 39 have inclined sides 42, 43 and a substantially flat bottom 44. Other configurations of V-grooves should be contemplated as being within the scope of this invention.

FIG. 5 shows one possible embodiment of a polishing fixture 58 and corresponding process 50 of polishing machine 62. The alignment pins 53, 54 are used as a datum in corresponding holes 60, 61 in fixture 58 to maintain the ferrule 51 perpendicular to the polishing surface 56 of the moving table 55 as it rotates in cycloidal (i.e. polar) "FIG. 8" movement at necessary speed. Lapping films 57 are attached to the moving table 55 to perform the polishing operation. The ferrule 51 is pushed against the abrasive surface of the lapping film 56 with a controlled force P. Prior to the start of the polishing operation 50, the alignment pins 53, 54 are pushed all the way down into holes 60, 61 and clamped to the fixture 58 so as to prevent undesired movement of ferrule 51.

It will be understood that the invention may be embodied in other specific forms without departing from the spirit or central characteristic thereof. The present examples and embodiments, therefore, are to be considered in all respects as illustrative and not restricted, and the invention is not to be limited to the details given herein.

We claim:

1. A method for the process of polishing of a fiber optic connector including a ferrule having a mating surface and alignment pins on a polishing machine having an abrasive surface and holes in a ferrule holding fixture comprising:

mounting the ferrule on the fixture of the polishing machine;

pushing the alignment pins into the holes of the fixture so as to use the pins as the datum for proper alignment;

clamping the ferrule to the fixture for the entire polishing process; and, pushing the ferrule against the abrasive surface with a controlled force.

* * * * *